Oct. 8, 1968     C. K. MISCOE     3,404,818

PACKAGE CONTAINERS

Filed Nov. 15, 1966

INVENTOR
Constance K. Miscoe

United States Patent Office 3,404,818
Patented Oct. 8, 1968

3,404,818
PACKAGE CONTAINERS
Constance K. Miscoe, 211 Palliser St.,
Johnstown, Pa. 15905
Filed Nov. 15, 1966, Ser. No. 594,523
2 Claims. (Cl. 224—42.42)

ABSTRACT OF THE DISCLOSURE

A shopping arranger for automotive vehicles is provided in the form of a pair of foldable quadrilateral members, each having four flat sides hinged at their intersections and a removable hinge connection between said pair of members at one intersection, each of said members being independently foldable into a flat planar unit.

---

This invention relates to package containers and particularly to a flexible container or arranger for holding packages and groceries in an automotive vehicle. The problem of holding packages in an automotive vehicle is one which is familiar to almost everyone and particularly to housewives. Bags of groceries, for example, when placed in a vehicle, as on the back seat or in the rear of a station wagon, tend to upset with starting and stopping and at the end of a shopping trip are scattered over the vehicle requiring considerable time and a great deal of irritation in rearranging. This is especially true in the case of mothers with young children who demand and deserve attention while such groceries or packages are being unloaded.

I have invented a container or arranger which can be conveniently carried in any automotive vehicle in a folded condition, require no significant space, yet when open will hold and arrange all of the packages and groceries which a shopper may desire without permitting them to upset and become disarranged.

In a preferred embodiment of my invention, I provide a pair of foldable members each having four sides foldable at the intersection of the sides and preferably removably connected at one such intersection. Each such foldable quadrilateral member is provided with an intermediate wall foldably attached to two opposite sides of such member intermediate their ends and foldable with the sides into a flat planar unit for storage. The device of this invention may preferably by constructed of fibreboard or plastic.

I have set out certain objects, purposes and advantages of my invention in the foregoing general description. Other objects, purposes and advantages of my invention will be apparent from the following description and the accompanying drawings in which.

Figure 1:
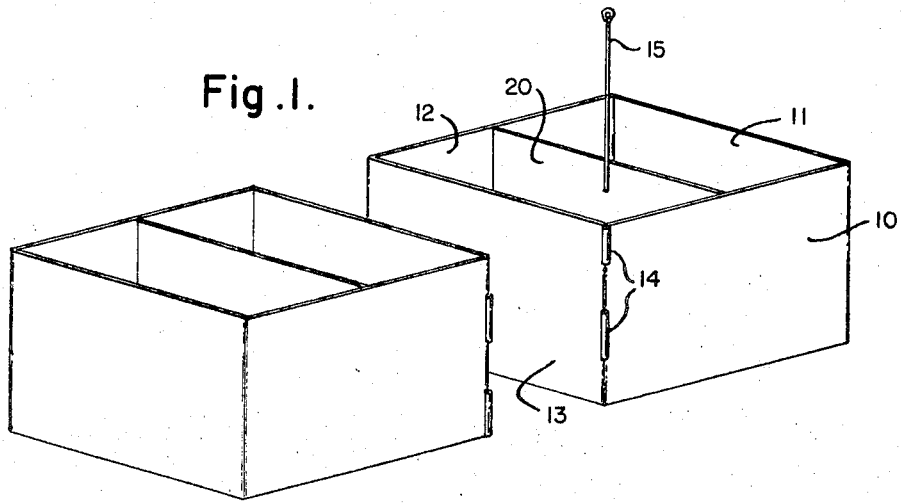
FIGURE 1 is an isometric view of a device according to my invention in the expanded position and disconnected into two halves.
Figure 4:
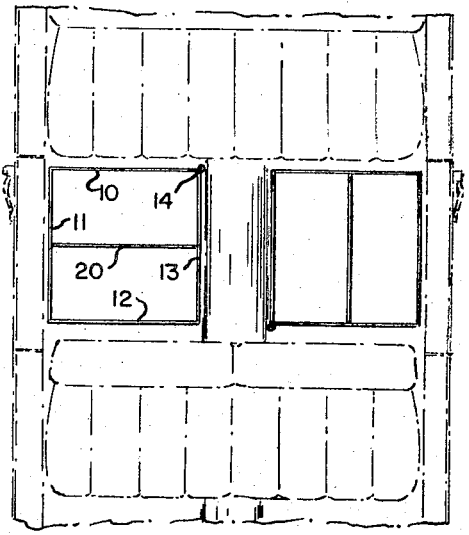

FGURE 3 is a top plan view of the device of FIGURE 1 with the two halves in side-by-side relation for use in the back of a station wagon or the like;

FIGURE 4 is a top plan view of the device of FIGURE 1 with the two halves separated one on each side of a hump of an automobile on the rear floor.

Figure 2:
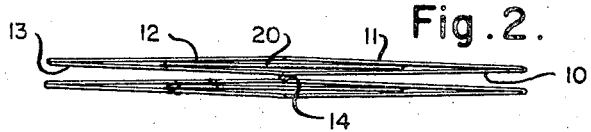
FIGURE 2 is the device of FIGURE 1 in folded position.
Figure 3:
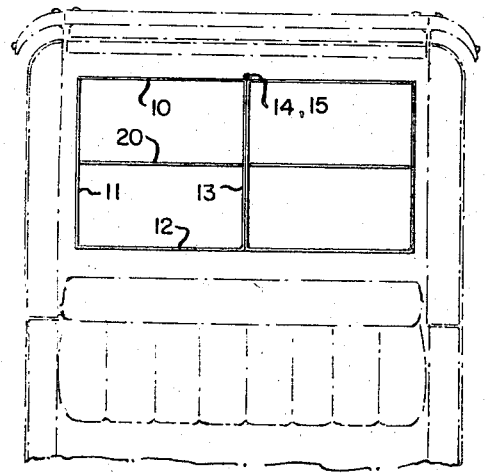

Referring to the drawings, I have illustrated a pair of identical separable quadrilaterals having sides 10, 11, 12, 13 foldable at each corner into a flat compact unit as shown in FIGURE 2. A connectible hinge unit 14 is provided at one corner of each quadrilateral through which pintle 15 is removable and insertable to form a connected unit as illustrated in FIGURE 3 or two separate units as illustrated in FIGURE 4. As a connected unit (FIGURE 3) the device is most adapted for the back of a station wagon and will hold and arrange large quantities of packages in a tidy compact group, free from any sliding. As separate units the two sections may be placed on the floor of an automobile, one on each side of the hump 16 to hold packages in arrangement against sliding and disarray. The advantages of such a unit to a woman shopper, particularly one with children, will be readily apparent. Loose groceries, soft drink bottles, packages and the like can all be readily held against slipping, sliding and breakage in the device of my invention. Preferably each quadrilateral is divided by a folding divider strip 20 to form two package units in each quadrilateral.

While I have illustrated and described a preferred embodiment of my invention in the foregoing specification, it will be understood that this invention may be otherwise embodied within the scope of the following claims.

I claim:
1. A shopping arranger for automotive vehicles comprising a pair of foldable quadrilateral members, each having four flat sides hinged at the intersections of the sides, spaced interfitting hinge pintles on each such member at one intersection of the sides and a removable elongated hinge pin in said pintles, said members being rotatable relatively to one another about said hinge pin through 180° and independently foldable into a flat generally planar unit in both the connected and disconnected state, said arranger having open top and bottom whereby a load confined within the members rests in direct engagement with a supporting portion of the vehicle.

2. An arranger as claimed in claim 1 having an intermediate wall foldably attached to two opposite sides of each member at their mid points and foldable with the sides into a flat generally planar unit.

References Cited

UNITED STATES PATENTS

| | | | |
|---|---|---|---|
| 2,369,552 | 2/1945 | Ferran | 224—42.42 |
| 2,654,509 | 10/1953 | Faust | 220—23.4 X |
| 2,814,408 | 11/1957 | Zebarth | 220—6 X |
| 2,820,560 | 1/1958 | Davis | 214—38 X |

ROBERT G. SHERIDAN, *Primary Examiner.*

R. J. SPAR, *Assistant Examiner.*